Patented Mar. 22, 1949

2,465,150

UNITED STATES PATENT OFFICE 2,465,150

MANUFACTURE OF HIGHLY POLYMERIC SUBSTANCES

James Tennant Dickson, Tranent, East Lothian, Scotland, assignor, by mesne assignments, to E. I. du Pont de Nemours and Company, Wilmington, Del., a corporation of Delaware No Drawing. Application December 29, 1945, Serial No. 638,485. In Great Britain August 23, 1943

Section 1, Public Law 690, August 8, 1946
Patent expires August 23, 1963

20 Claims. (Cl. 260—75)

This invention relates to synthetic products having valuable and unusual properties and to filaments, fibres and the like produced therefrom.

This case is a continuation-in-part of my prior application Serial No. 553,955 filed September 13, 1944, now abandoned.

Synthetic linear polyesters derived from glycols of the general formula $HO(CH_2)_mOH$, and dibasic acids of the general formula $$HOOC(CH_2)_nCOOH$$

in which $m$ and $n$ are integers greater than 1, are known. However, although the hitherto described linear polyesters are capable of being drawn into strong, pliable fibres showing by characteristic X-ray patterns, orientation along the fibre axis, they suffer from the defect of low melting point, and considerable solubility in a variety of organic solvents, and they are easily hydrolysed both by acids and alkalis, and are of no utility in the textile field.

This invention has as an object the provision of new and useful linear, highly polymeric esters having valuable properties, including that of being capable of being formed into useful filaments, fibres and the like, and having high melting points, a very low moisture regain, a low solubility in solvents, good resistance to acids, and very appreciable resistance to alkalis. A further object is the provision of new and useful synthetic filaments and fibres. Other objects will appear thereafter.

The synthetic products according to the present invention are high-melting, difficultly soluble, usually micro-crystalline, cold drawing, highly polymerised esters of diphenoxy-alkane-4.4'-dicarboxylic acids of the general formula $$HOOC\text{—}C_6H_4\text{—}O\text{—}(CH_2)_n\text{—}O\text{—}C_6H_4\text{—}COOH$$

and glycols of the series $HO(CH_2)_mOH$, where both $m$ and $n$ are integers within the range of 2 to 10.

The synthetic products according to the invention are therefore highly polymeric polymethylene diphenoxyalkane-4.4'-dicarboxylates; they are linear in structure with recurring structural units of the general formula:

in which both $m$ and $n$ are integers within the range of 2 to 10.

The highly polymeric products according to the invention have a more or less well defined crystalline or micro-crystalline structure, and fairly definite melting points. When extruded or drawn in the molten state, they yield filaments which can be subsequently cold-drawn to the extent of several hundred per cent. of their length, whereby fibres are obtained which show molecular orientation along the fibre axis by characteristic X-ray patterns, and possess great strength and pliability.

In addition, the highly polymeric products, as well as the fibres derived from them, have a very low moisture regain, a low solubility in solvents, a good resistance to acids, and a very appreciable resistance to alkalis, which is quite unexpected in esters.

Although highly polymeric products in accordance with this invention can be obtained from polymethylene glycols having from 2 to 10 methylene groups, i. e. from ethylene glycol, trimethylene glycol, pentamethylene glycol, hexamethylene glycol, heptamethylene glycol, octamethylene glycol, nonamethylene glycol, and decamethylene glycol, the above desirable properties are more developed in products derived from a glycol possessing an even number of methylene groups, and of these glycols, they are most developed in products derived from ethylene glycol, $HO(CH_2)_2OH$, which is also preferred on the grounds of cost and availability. Mixtures of the glycols may be used if desired.

Likewise, although highly polymeric products in accordance with this invention can be obtained from diphenoxyalkane-4.4'-dicarboxylic acids having from 2 to 10 methylene groups in the polymethylene chain which links the two benzene rings, the above desirable properties are more developed in products derived from the acids with an even number of methylene groups in said chain, and most developed in products derived from diphenoxyethane-4.4'-dicarboxylic acid, which is also preferred on the grounds of cost and availability. Mixtures of diphenoxyalkane-4.4'-dicarboxylic acids may be used if desired.

Furthermore, I have found the above desirable properties most highly developed in products resulting from the condensation of a polymethylene glycol having an even number of methylene groups and a diphenoxyalkane-4.4'-dicarboxylic acid also possessing an even number of methylene groups in the polymethylene chain which links the two benzene rings, and of these products, highly polymeric ethylene diphenoxyethane-4.4'-dicarboxylate, the products obtained from ethylene glycol and diphenoxyethane-4.4'-dicarboxylic acid, is preferred because of its most prominent desirable properties, and also on the grounds of cost and availability. Polymeric ethylene diphenoxyethane-4.4'-dicarboxylate contains the following recurring structural unit:

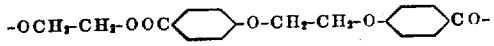

The highly polymeric products according to the invention can be made by heating glycols of the series HO(CH$_2$)$_m$OH, where $m$ is an integer within the range of 2 to 10, with diphenoxyalkane-4.4'-dicarboxylic acids of the general formula HOOC—C$_6$H$_4$—O—(CH$_2$)$_n$—O—C$_6$H$_4$—COOH where $n$ is an integer within the range of 2 to 10, or with esters or other derivatives of such acids which are capable of reacting with said glycols to form glycol esters, the reaction products being further heated above their melting point until highly polymeric esters having cold-drawing properties are obtained.

The highly polymeric polymethylene diphenoxyalkane-4.4'-dicarboxylates of the invention may be made by heating a mixture of a diphenoxyalkane-4.4'-dicarboxylic acid of the general formula HOOC—C$_6$H$_4$—O—(CH$_2$)$_n$—O—C$_6$H$_4$—COOH where $n$ is an integer within the range of 2 to 10, and a glycol of the series HO(CH$_2$)$_m$OH, where $m$ is an integer within the range of 2 to 10, in which at least about one molecular proportion of the glycol is present relative to the acid. Preferably higher proportions of the glycol relative to the acid are used, for instance one and a half to five molecular proportions of the glycol per molecular proportion of the acid, since by using such excess the initial esterification is caused to take place much more readily. Known esterifying catalysts, such as hydrogen chloride, p-toluene sulphonic acid or camphor sulphonic acid, may be added to speed up this part of the reaction, but the esterification also proceeds satisfactorily in the absence of such catalysts. Once all the acid has reacted with the glycol, the temperature is increased, the excess of the glycol present is removed from the reaction mixture by distillation, usually under reduced pressure, and the residue is further heated above its melting point. During this process of heating further amounts of the glycol are liberated while polymerisation proceeds, and the melting point, and the viscosity of the reaction mixture gradually increase. The liberated glycol is continuously removed by distillation from the reaction zone, and the heating is carried on until a product having cold-drawing properties is obtained, that is to say, until filaments formed from the melt possess the property of cold-drawing. The heating may be effected at atmospheric or subatmospheric pressure and should be in an inert atmosphere, that is, in the absence of an oxygen containing gas. For instance, a stream of an inert gas, such as nitrogen or hydrogen, is bubbled through the molten mass through a capillary. Any inert gas can be employed.

The reactions involved are firstly the esterification of the diphenoxyalkane-4.4'-dicarboxylic acid with the glycol and the formation of the appropriate glycol ester of said acid, and secondly the formation from this ester of polymeric polymethylene diphenoxyalkane-4.4'-dicarboxylates of increasing molecular weight up to the stage at which a product is obtained which is capable of being formed from the melt into filaments which can be cold-drawn.

Alternatively, the highly polymeric polymethylene diphenoxyalkane-4.4'-dicarboxylate of this invention can be made by heating ester-forming derivatives of diphenoxyalkane-4.4'-dicarboxylic acids with glycols of the series HO(CH$_2$)$_m$OH, where $m$ is an integer within the range of 2 to 10. Suitable ester forming derivatives are aliphatic or aromatic esters of diphenoxyalkane-4.4'-dicarboxylic acids, for instance, low molecular alkyl esters such as methyl, ethyl, propyl, butyl, amyl, hexyl and heptyl diphenoxyalkane-4.4'-dicarboxylates, and aryl esters such as those from phenol, cresols and other homologues. The reaction involved is an ester interchange reaction. In practice, it is preferred to use the methyl or ethyl diphenoxyalkane-4.4'-dicarboxylates, since these are the most readily available. Other ester-forming derivatives can be used, such as diphenoxyalkane-4.4'-dicarboxylic acid dihalides, including the dichloride, dibromide, and di-iodide, but of these the dichloride is preferred on the grounds of cost and availability.

Ester interchange reactions are reversible reactions and may be represented by the following equation:

ROAC + R'OH ⇌ R'OAC + ROH

A factor which displaces the equilibrium in the desired direction is the presence of an excess of the displacing alcohols; also in practice, the operation is effected under conditions such that the displaced alcohol can be removed by distillation, using a displacing alcohol having an appreciably higher boiling point than the alcohol to be displaced; this involves using reaction temperatures below the boiling point of the displacing alcohols, but well above that of the alcohol to be displaced.

Thus, in carrying out the ester interchange reaction for the production of the highly polymeric esters of this invention, at least one molecular proportion of the glycol per molecular proportion of the diphenoxyalkane-4.4'-dicarboxylate should be used, greater proportions being preferred. An excess of about 50% is generally sufficient, but still greater proportions may be used if desired.

It is desirable to use an ester of the diphenoxyalkane-4.4'-dicarboxylic acid formed from an alcohol or phenol with a boiling point sufficiently below that of the glycol to be used so that the former can be easily removed from the reaction zone by distillation. But, as indicated previously, it is preferred to use the methyl or ethyl esters, and these esters are formed from alcohols which, because of their relatively low boiling points, are easily separated by distillation from the glycols to be used for this invention.

The heating to effect the ester interchange reaction according to this invention should be above the melting point of the reaction mixture and above the boiling point of the alcohol or phenol to be displaced, but not substantially above the boiling point of the glycol; temperatures approximating the boiling point of the glycol are advantageous. The heating should be effected under conditions such that the displaced alcohol or phenol can be removed from the reaction zone, usually by means of conventional distillation equipment. The heating is usually at atmospheric pressures, but higher or lower pressures may be used if desired. Preferably the heating is effected in an inert atmosphere, e. g. in the presence of an inert gas, such as nitrogen or hydrogen. Heating is continued until the distillation of the displaced alcohol or phenol ceases, at which stage the ester interchange can be assumed to be completed.

When using the ester interchange method, the time required to form the glycol diphenoxyalkane-4.4'-dicarboxylates may be considerably shortened, as compared with the direct method, i. e. from the diphenoxyalkane-4.4'-dicarboxylic acid itself and a glycol.

The reaction between the diphenoxyalkane-4.4'-dicarboxylic acid dihalides and the glycols is best carried out in the presence of a diluent, for example, an inert organic solvent such as chloroform or tetrachlorethane, and in the presence of a base, usually a tertiary organic base such as pyridine, N-methyl piperidine, N-dimethyl aniline, or N-diethyl aniline. Any inert solvent can be used in this process.

The ester interchange reaction is advantageously carried out in the presence of ester interchange catalysts. If no catalyst is present the reaction proceeds very slowly. Ester interchange catalysts which have been tried and found to be suitable to a varying degree are lithium, sodium, potassium, calcium, beryllium, magnesium, zinc, cadmium, aluminum, chromium, molybdenum, manganese, iron, cobalt, nickel, copper, silver, mercury, tin, lead, bismuth, antimony, platinum and palladium. Some of these, such as sodium, lithium, potassium, calcium, magnesium, zinc, cadmium, manganese, iron, nickel, cobalt, tin, lead and bismuth have been found to be efficient ester interchange catalysts when used alone, but good results are also obtained when using small amounts of an alkali metal, e. g. 0.025% to 0.1%, on the weight of the initial ester, and one or more of the metals beryllium, magnesium, zinc, cadmium, copper, silver, aluminum, chromium, molybdenum, manganese, iron, nickel, cobalt, mercury, tin, lead, bismuth, antimony, platinum and palladium. The quantities of the latter metals present can be varied widely.

The ester interchange catalysts may be added in the form of powder, chips, shavings, ribbon, wire or in any other convenient form. The alkali metals, the alkaline earth metals or magnesium are conveniently used in the form of alcoholates, formed by dissolving them in the glycol to be used or in another alcohol such as methyl or ethyl alcohol. Further, the alkali metals may be used in the form of their carbonates or other alkaline reacting salts, for example, borates. Magnesium may be used in the form of its oxide.

It has also been found that the ester interchange process is accelerated by the presence of non-metallic ester interchange catalysts, for example, boron, or by purely surface catalysts, such as broken glass or silica gel, in the presence of a small amount of an alkali metal ester interchange catalyst. As a matter of fact any of the known compatible ester interchange catalysts can be employed.

The products of the ester interchange reaction, or the low molecular weight polymeric polymethylene diphenoxyalkane-4.4'-dicarboxylates otherwise obtained, can be converted into the highly polymeric products of this invention by heating them at a temperature above the boiling point of the corresponding glycol, under conditions effecting removal of the glycol. Advantageously, during the heating or during part of the heating, the pressure is reduced so as to facilitate rapid distillation of excess of glycol present. The pressure may be reduced in successive stages so that the heating begins at normal pressure, is continued at a reduced pressure and is completed at a still further reduced pressure. Pressures of from 20 down to 1 mm. of mercury are particularly suitable. Higher or lower pressures may be used if desired. The materials used as catalysts may also be present during this stage of the reaction. Metal catalysts may be added to accelerate polymerization in the second part of the process when starting from the free acid or the acid dihalide.

The heating should be conducted under conditions to prevent oxidation, that is, the presence of oxygen should be avoided and a slow stream of an inert gas, for example nitrogen or hydrogen, is advantageously passed through and/or over the molten mass.

During the heating, the melting point and the viscosity of the melt gradually increase; the temperature must be maintained high enough to keep the mass in the molten state during the whole of the heating period.

The heating is continued at least until a filament formed from the melt possesses the property of cold-drawing. After the heating is completed, the product may be extruded or otherwise removed from the reaction vessel in molten form, and subsequently cooled. The extruded material may be formed into blocks, chips and the like.

The esters of this invention when freshly formed and in the undrawn state are sometimes amorphous in character. They become microcrystalline upon standing. They are highly-viscous, transparent to slightly opaque liquids, depending on the presence or absence of inorganic materials added as catalysts, at temperatures slightly above their melting points. If the melts are allowed to cool slowly or if the esters are heated at a temperature somewhat below their melting points, crystallisation suddenly occurs and the glassy solids become porcelain-like, opaque solids. The esters have melting points ranging up to about 245° C. for the polymeric ethylene diphenoxyethane-4.4'-dicarboxylate, these melting points increasing rapidly with their degree of polymerisation. They have solubilities in organic liquids which decrease with their degree of polymerisation. They are resistant to hot and cold dilute acids, and little affected by hot and cold dilute alkalis. For instance, highly polymeric ethylene diphenoxyethane-4.4'-dicarboxylate is practically unaffected by boiling 5 N hydrochloric acid for 3 hours, boiling 0.1 N hydrochloric acid for 24 hours, and boiling 0.1 N sodium hydroxide for 24 hours.

When extruded or drawn in the molten state, the highly polymeric polymethylene diphenoxyalkane-4.4'-dicarboxylates yield filaments which are capable of being cold-drawn to the extent of several hundred per cent. of their original length to form molecularly oriented structures, i. e. fibres of great strength and pliability are obtained, and it is in the form of such filaments and fibres that the highly polymeric esters of the invention find their greatest utility in the art.

The filaments can be formed by extrusion or by drawing from the melt directly after the completion of the heating during which the highly polymeric product is formed. Alternatively, blocks or chips or like shapes may be remelted and thereafter formed into filaments. Any suitable apparatus can be used.

The cold-drawing operation may be carried out on filaments which have been allowed fully to cool and solidify after their formation, or it may directly follow the formation of the filaments as one part of a continuous process. Any suitable apparatus and process may be used for cold-drawing. For instance, the filaments may be wound from one roller to another, the second roller rotating at a higher speed than the first roller, for example, at a speed up to about 4 or 5 times that of the first roller. Alternatively, the cold-drawing may be effected by employing a snubbing pin.

The term cold-drawing, as used herein, includes warming the filaments to facilitate stretching, for instance, by passing them through warm or hot water or steam before and/or during the cold-drawing operation.

The polymeric polymethylene diphenoxyalkane-4.4'-dicarboxylates of the present invention are new compounds. Likewise, the free diphenoxyalkane-4.4'-dicarboxylic acids, their lower dialkyl esters, their diphenyl ester, and their acid dihalides, which are used in the preparation of the highly polymeric polymethylene diphenoxyalkane-4.4'-dicarboxylates of the present invention, are also new compounds.

The diphenoxyalkane-4.4'-dicarboxylic acids may be prepared by reacting 2 molecules of di-sodium and di-potassium 4-hydroxy benzoate with one molecule of the corresponding alkylene dihalide in an inert solvent such as toluene, extracting with water, and acidifying the aqueous layer to precipitate the free acid, but they are obtained in better yield by hydrolysis of their lower dialkyl esters such as the di-ethyl ester.

The dimethyl or diethyl esters of diphenoxyalkane-4.4'-dicarboxylic acids may be prepared by refluxing two molecules of the sodium or potassium salt of 4-hydroxy benzoic acid methyl or ethyl esters with one molecule of the corresponding alkylene dihalide in alcohol.

The diphenyl esters of diphenoxyalkane-4.4'-dicarboxylic acids may be prepared from the corresponding diphenoxyalkane-4.4'-dicarboxylic acid dichlorides by heating same with an excess of phenol in xylene.

The diphenoxyalkane-4.4'-dicarboxylic acid dichlorides may be prepared by heating the free acid with a mixture of phosphorus pentachloride and phosphorus oxychloride.

The invention will now be further described in the following specific examples, which are to be regarded solely as illustrative, and not as restricting the scope of the invention.

*Example 1*

A mixture of 4.8 grams diethyl diphenoxyethane-4.4'-dicarboxylate, 1.5 ccs. ethylene glycol, and 2.5 milligrams of lithium dissolved in 1 cc. ethyl alcohol is heated in a distilling tube in a stream of oxygen-free nitrogen for about 2 hours at 197° C., until most of the ethyl alcohol is removed and the ester interchange practically complete. The resulting glycol ester is then further heated at 280° C. for 30 minutes and then for a further 5½ hours in vacuo, a small amount of nitrogen being introduced through a capillary. The product is a micro-crystalline polymer melting at 235°–245° C., which readily yields fibres possessing good cold-drawing properties.

*Example 2*

A mixture of 10.74 grams diethyl diphenoxyethane-4.3'-dicarboxylate, 3.3 ccs. ethylene glycol, and 3 milligrams lithium dissolved in 1.2 ccs. methyl alcohol are heated in a distilling tube in presence of 5 inches of clean magnesium ribbon as in Example 1 at 197° C., and the ester interchange reaction is practically complete after only one hour. The resulting low polymeric glycol ester is further heated at 280° C. as in Example 1, but the high polymer possessing the desired properties is obtained after 3½ hours.

Cold-drawing high polymers are obtained by the methods described in Examples 1 and 2, from diethyl diphenoxyethane-4.4'-dicarboxylate and other glycols of the series HO(CH$_2$)$_m$OH, such as trimethylene, pentamethylene, hexamethylene, and decamethylene glycols. The melting points of the high polymers obtained from these glycols are 155–160° C., 100° C., 170° C. and 135–140° C. respectively.

*Example 3*

A mixture of 3.7 grams diethyl-diphenoxypropane-4.4'-dicarboxylate, 1.1 ccs. ethylene glycol, and 1.5 milligrams of lithium dissolved in 0.45 cc. methyl alcohol, is heated in presence of 3" of magnesium ribbon in a distilling tube in a stream of oxygen-free nitrogen for one hour at 197° C., by which time the ester interchange is practically complete. The resulting glycol ester is then further heated at 280° C. for 15 minutes, and then for a further 5 hours, at the same temperature in vacuo, a small amount of nitrogen being introduced through a capillary. The product is a micro-crystalline polymer melting at 190° C., which yields fibres capable of being cold-drawn.

Crystalline high polymers possessing cold-drawing properties are obtained by the method described above from ethylene glycol and di-ethyl-diphenoxybutane-4.4'-dicarboxylate, di-ethyl-diphenoxypentane-4.4'-dicarboxylate, and diethyl-diphenoxyhexane-4.4'-dicarboxylate. The melting points of the high polymers are 215° C., 150° C., and 170° C. respectively.

*Example 4*

A mixture of 4 grams diethyl-diphenoxypentane-4.4'-dicarboxylate, 1.8 grams hexamethylene glycol, and 1 milligram lithium dissolved in 0.3 cc. of methyl alcohol is heated in presence of 2" of magnesium ribbon as in Example 1 for 45 minutes at 197° C., 15 minutes at 245° C. in nitrogen, and 4 hours at the same temperature in vacuo. The product is a crystalline cold-drawing polymer melting at 160–165° C.

*Example 5*

A crystalline, cold-drawing polymer melting at 135° C. is obtained by the method of the preceding example from diethyldiphenoxyhexane-4.4'-dicarboxylate and decamethylene glycol.

*Example 6*

A mixture of 4 grams diphenoxyethane-4.4'-dicarboxylic acid and 7.4 ccs. ethylene glycol is heated at 197° C. for 50 hours in an atmosphere of nitrogen, and for a further 4½ hours at 245° C. to complete esterification. The heating was continued in vacuo at the same temperature for 18½ hours, when a crystalline, cold-drawing polymer was obtained.

*Example 7*

A mixture of 4.54 grams diphenyl-diphenoxyethane-4.4'-dicarboxylate, 2.1 ccs. ethylene glycol, and 5 milligrams potassium carbonate is heated gradually to 280° C. in a stream of oxygen-free nitrogen, and kept at that temperature for 30 mins. A vacuum is then applied for 15 mins. to remove the last traces of phenol, 1 milligram lithium dissolved in 0.3 cc. methyl alcohol, and 2" of magnesium ribbon are added, and the heating is continued in vacuo for 4 hours at 280° C. The product is a crystalline, cold-drawing high polymer.

Example 8

10.17 grams diphenoxyethane-4.4'-dicarboxylic acid chloride is added slowly to a solution of 2 ccs. ethylene glycol and 5.7 ccs. pyridine in 50 ccs. chloroform, and the mixture is gently refluxed for 1 hour, cooled, and poured into ether. A brown oil separates, which is washed with dilute acid, and the resulting solid is further washed with water and fully dried. The resulting low ethylene polyester is then heated in nitrogen in presence of lithium and magnesium catalysts as in the foregoing examples, whereby a crystalline, cold-drawing high polymer is obtained.

Example 9

The cold-drawing high polymer obtained from diethyl-diphenoxyethane-4.4'-dicarboxylate and ethylene glycol according to Example 2 is spun into a lustrous colourless filament by extruding the molten polymer at 295° C. through an orifice 0.6 mm. in diameter, under a pressure of 10–15 lbs. of nitrogen gas. The extruded filament is wound up on a suitable bobbin and afterwards cold-drawn up to as much as 400%. The resulting fibre possesses the above described excellent properties.

I claim:

1. Highly polymeric linear diphenoxy-n-alkane-4.4'-dicarboxylic esters comprising essentially recurring structural units of the formula

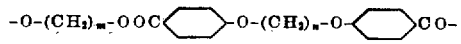

wherein $m$ and $n$ represent integers within the range of 2 to 10, said esters, when formed into filaments, having the characteristic property of being capable of being cold-drawn to the extent of more than two hundred per cent. of the original length to form fibres of great strength and pliability.

2. A highly polymeric linear diphenoxyethane-4.4'-dicarboxylic ester comprising essentially recurring structural units of the formula $-O-CH_2-CH_2-OOC\langle\ \rangle-O-CH_2-CH_2-O-\langle\ \rangle CO-$ said ester, when formed into filaments, having the characteristic property of being capable of being cold-drawn to the extent of more than two hundred per cent. of the original length to form fibres of great strength and pliability, said ester having a melting point above 230° C.

3. Highly polymeric linear polymethylene diphenoxy-n-alkane-4.4'-dicarboxylates comprising essentially recurring structural units of the formula

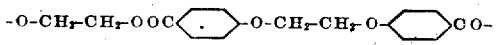

wherein $m$ and $n$ represent integers within the range from 2 to 10, in the form of cold-drawn fibres of great strength and pliability.

4. A highly polymeric linear ethylene-diphenoxyethane-4.4'-dicarboxylate in the form of cold-drawn fibres of great strength and pliability, said ester having a melting point above 230° C.

5. In the manufacture of highly polymeric materials which are capable of being formed into filaments having cold-drawing properties, the process which comprises heating polymethylene diphenoxy-n-alkane-4.4'-dicarboxylate having from 2 to 10 carbon atoms in each of its poly- methylene and n-alkane chains, at temperatures above its melting point to produce a high polymer; removing by distillation the polymethylene glycol which is liberated and continuing the heating until a stage is reached where filaments formed from the melt possess the property of cold-drawing.

6. The process of claim 5 wherein the heating is conducted in an inert atmosphere.

7. The process of claim 5 wherein said polymethylene glycol is removed by distillation under reduced pressure.

8. The process of claim 5 wherein the heating is conducted in presence of a polymerisation catalyst.

9. In the manufacture of highly polymeric materials which are capable of being formed into filaments having cold-drawing properties, the process which comprises heating and reacting in excess of one mol. and up to 5 mols. of polymethylene glycol having from 2 to 10 carbon atoms with one mol. of a diphenoxy-n-alkane-4.4'-discarboxylic acid body which is capable of reacting with said glycol to form a glycol ester, and selected from a class consisting of the diphenoxy-n-alkane-4.4'-dicarboxylic acids having from 2 to 10 carbon atoms in its -n-alkane chain, low molecular weight alkyl esters of such acids having from 1 to 7 carbon atoms in the alkyl group esters of monohydric phenols and such acids, and acid chlorides, bromides and iodides of such acids, to produce polymethylene glycol diphenoxy-n-alkane-4.4'-dicarboxylate, and further heating such polymethylene glycol diphenoxy-n-alkane-4.4'-dicarboxylate at temperatures above its melting point to produce a high polymer, removing by distillation the polymethylene glycol which is liberated, and continuing the heating until a stage is reached at which filaments formed from the mass possess the property of cold-drawing.

10. The process of claim 9 wherein the heating is conducted in an inert atmosphere.

11. The process of claim 9 wherein said polymethylene glycol is removed by distillation under a reduced pressure.

12. The process of claim 9 wherein said polymethylene glycol is removed by distillation under a reduced pressure, and the pressure is lowered progressively as the removal of the glycol proceeds.

13. In the manufacture of highly polymeric materials which are capable of being formed into filaments having cold-drawing properties, the process which comprises heating and reacting in excess of one mol. and up to 5 mols. of polymethylene glycol having from 2 to 10 carbon atoms with one mol. of diphenoxy-n-alkane-4.4'-dicarboxylic acid having from 2 to 10 carbon atoms in its -n-alkane chain, to produce polymethylene glycol diphenoxy-n-alkane-4.4'-dicarboxylate, and further heating said polymethlyene glycol diphenoxy-n-alkane-4.4'-dicarboxylate at temperatures above its melting point to produce a high polymer, removing by distillation the polymethylene glycol which is liberated and continuing the heating until a stage is reached where filaments formed from the mass possess the property of cold-drawing.

14. The process of claim 13 wherein the reaction is carried out in presence of an esterifying catalyst.

15. In the manufacture of highly polymeric materials which are capable of being formed into filaments having cold-drawing properties, the process which comprises heating and reacting one mol of an ester of diphenoxy-n-alkane-4.4'-dicarboxylic acid having from 2 to 10 carbon atoms in its -n-alkane chain, with in excess of 1 mol and up to 5 mols of polymethylene glycol having from 2 to 10 carbon atoms, under conditions producing ester interchange and the formation of the corresponding polymethylene glycol diphenoxy-n-alkane-4.4'-dicarboxylate, then further heating said polymethylene glycol diphenoxy-n-alkane-4.4'-dicarboxylate at temperatures above its melting point to form a high polymer, removing by distillation the polymethlyene glycol which is liberated, and continuing the heating until a stage is reached at which filaments formed from the mass possess the property of cold-drawing.

16. In the manufacture of highly polymeric materials which are capable of being formed into filaments having cold-drawing properties, the process which comprises heating and reacting one mol of an ester of saturated aliphatic monohydric alcohol having from 1 to 7 carbon atoms and diphenoxy-n-alkane-4.4'-dicarboxylic acid having from 2 to 10 carbon atoms in its n-alkane chain, with in excess of 1 mol and up to 5 mols of polymethylene glycol having from 2 to 10 carbon atoms, said glycol having a boiling point above the boiling point of said alcohol, in the presence of an ester-interchange catalyst, removing the alcohol formed by the reaction by heating to temperatures above the boiling point of said alcohol, then further heating at temperatures above the melting point of the resulting polymethylene glycol diphenoxy-n-alkane-4.4'-dicarboxylate to form a high polymer, removing by distillation the polymethylene glycol which is liberated, and continuing the heating until a stage is reached at which filaments removed from the mass possess the property of cold-drawing.

17. The process of claim 16 wherein said ester-interchange catalyst comprises an alkali metal.

18. The process of claim 16 wherein said ester-interchange catalyst comprises an alkali metal together with another metal.

19. In the manufacture of highly polymeric materials which are capable of being formed into filaments having cold-drawing properties, the process which comprises heating and reacting in an inert atmosphere in excess of one mol. to 5 mols of ethylene glycol with one mol. of diphenoxyethane-4.4'-dicarboxylic acid to produce ethylene diphenoxyethane - 4.4' - dicarboxylate, then further heating at temperatures sufficiently high to distil off the excess of ethylene glycol under a reduced pressure, heating the residue above its melting point to produce a high polymer, and removing by distillation the ethylene glycol which is liberated and continuing the heating until a stage is reached at which filaments formed from the mass possess the property of cold-drawing.

20. The process of claim 19 wherein an atmosphere of nitrogen is employed in the initial heating step and the pressure is progressively reduced as the distillation proceeds in the second step of said process.

JAMES TENNANT DICKSON.

REFERENCES CITED

The following references are of record in the file of this patent:

Carothers, Collected Papers, pp. 156–164 (Interscience Pub. New York, 1940).